US 6,693,964 B1

(12) United States Patent
Zhang et al.

(10) Patent No.: US 6,693,964 B1
(45) Date of Patent: Feb. 17, 2004

(54) METHODS AND ARRANGEMENTS FOR COMPRESSING IMAGE BASED RENDERING DATA USING MULTIPLE REFERENCE FRAME PREDICTION TECHNIQUES THAT SUPPORT JUST-IN-TIME RENDERING OF AN IMAGE

(75) Inventors: Cha Zhang, Beijing (CN); Jin Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/535,059

(22) Filed: Mar. 24, 2000

Related U.S. Application Data
(60) Provisional application No. 60/193,071, filed on Mar. 24, 2000.

(51) Int. Cl.[7] .................................................. H04N 7/18
(52) U.S. Cl. .............................. 375/240.16; 375/240.14
(58) Field of Search .................................. 345/418–428; 382/107, 167, 154; 348/43–60; 375/240.08–240.17

(56) References Cited

U.S. PATENT DOCUMENTS 6,028,608 A * 2/2000 Jenkins ........................ 345/619
6,222,937 B1 * 4/2001 Cohen et al. ................ 382/154
6,476,805 B1 * 11/2002 Shum et al. ................. 345/420
6,487,304 B1 * 11/2002 Szeliski ....................... 382/107

* cited by examiner

Primary Examiner—Andy Rao
(74) Attorney, Agent, or Firm—Lee & Hayes PLLC

(57) ABSTRACT

Methods and arrangements are provided for compressing image-based rendering (IBR) data, storing and transporting the compressed IBR data, and subsequently providing selective just-in-time (JIT) rendering of an image using only a portion of the compressed IBR data. An array of images is formatted according to a multiple reference frame (MRF) structure that includes anchor frames and predicted frames. Each predicted frame references at least one anchor frame. Each anchor frame is independently encoded. Each predicted frame is encoded using motion compensation and a predicted residue associated with the referenced anchor frames. A resulting MRF bitstream includes encoded anchor frame data, encoded predicted frame data and indexing information that allows for selective random access to individual macroblocks within the encoded anchor frame data and the encoded predicted frame data. Thus, a new view of an image may be rendered by simply accessing only that macroblock information that needed to render the new view. Once decoded, macroblock information can be selectively stored in a cache and accessed again and again, to speed up the rendering of subsequent views.

113 Claims, 7 Drawing Sheets

METHODS AND ARRANGEMENTS FOR COMPRESSING IMAGE BASED RENDERING DATA USING MULTIPLE REFERENCE FRAME PREDICTION TECHNIQUES THAT SUPPORT JUST-IN-TIME RENDERING OF AN IMAGE

RELATED CASES

This non-provisional utility application is related to provisional application Serial No. 60/193,071, filed concurrently, on Mar. 24, 2000, entitled "Compression of Concentric Mosaics Scenery with Reference Block Coding", which is incorporated by reference herein.

TECHNICAL FIELD

This invention relates generally to computers and, more particularly, to methods and arrangements that can be implemented to compress image-based rendering (IBR) information, transport the compressed IBR information, and subsequently provide selective and/or just in time (JIT) rendering of an image based rendering scene on a portion of the compressed IBR information.

BACKGROUND

There is a continuing interest, within the computer graphics community, in image-based rendering (IBR) systems. These systems are fundamentally different from traditional geometry-based rendering systems, in that the underlying information (i.e., data representation) is composed of a set of photometric observations (e.g., digitized images/photographs) rather than being either mathematical descriptions of boundary regions or discretely sampled space functions.

An IBR system uses the set of photometric observations to generate or render different views of the environment and/or object(s) recorded therein. There are several advantages to this approach. First, the display algorithms for IBR systems tend to be less complex and may therefore be used to support real-time rendering in certain situations. Secondly, the amount of processing required to view a scene is independent of the scene's complexity. Thirdly, the final rendered image may include both real photometric objects and virtual objects.

IBR systems can be complex, however, depending upon the level of detail required and the processing time constraints. For example, Adelson et al., in their article entitled "The Plenoptic Function And The Elements Of Early Vision", published in Computational Models of Visual Processing by The MIT Press, Cambridge, Mass. 1991, stated that a 7-dimensional plenoptic function can be implemented in an IBR system to completely represent a 3-dimensional dynamic scene. The 7-dimensional plenoptic function is generated by observing and recording the intensity of light rays passing through every space location as seen in every possible direction, for every wavelength, and at any time. Thus, imagine an idealized camera that can be placed at any point in space $(V_x, V_y, V_z)$. This idealized camera can then be used to select any of the viewable rays by choosing an azimuth angle $(\theta)$ and elevation angle $(\phi)$, as well as a band of wavelengths $(\lambda)$. Adding an additional parameter (t) for time produces a 7-dimensional plenoptic function:

$$p = P(\theta, \phi, \lambda, V_x, V_y, V_z, t)$$

Thus, given function p, to generate a view from a specific point in a particular direction, one need only to merely plug-in the values for $(V_x, V_y, V_z)$ and select from a range of $(\theta, \phi)$ for some constant t for each desired a band of wavelengths $(\lambda)$.

Accomplishing this in real-time, especially for a full spherical map or a large portion thereof, is typically beyond most computer's processing capability. Thus, there has been a need to reduce the complexity of such an IBR system to make it more practical.

By ignoring the time (t) and the wavelength $(\lambda)$ parameters, McMillan and Bishop in their article entitled "Plenoptic Modeling: An Image-Based Rendering System" published in Computer Graphics (SIGGRAPH'95) August 1995, disclosed a plenoptic modeling scheme that generates a continuous 5-dimensional plenoptic function from a set of discrete samples.

Further research and development by Gortler et al., lead to the development of the Lumigraph as disclosed in an article entitled "The Lumigraph" that was published in Computer Graphics (SIGGRAPH'96) in August, 1996. Similarly, Levoy et al. developed a Lightfield as disclosed in an article entitled "Light Field Rendering" that was also published in Computer Graphics (SIGGRAPH'96) in August of 1996.

The Lumigraph and the Lightfield presented a clever 4-dimensional parameterization of the plenoptic function provided the object (or conversely the camera view) is constrained, for example, within a bounding box. As used herein, the term "Lumigraph" is used generically to refer to Lumigraph, Lightfield, and other like applicable plenoptic function based techniques.

By placing the object in its bounding box (e.g., a six-sided cube) which is surrounded by a larger box (e.g., a larger six-sided cube), the Lumigraph indexes all possible light rays from the object through the coordinates that the rays enter and exit one of the parallel planes of the double bounding boxes. Thus, in the case of a six-sided cube, the resulting Lumigraph data is thus composed of six 4-dimensional functions that can be discretized more precisely for the inner bounding box closest to the object, and more coarsely for the outer bounding box.

In the examples that follow, the bounding box and larger box are assumed to be six-sided cubes, wherein the plane of the inner box which is being considered is indexed with coordinates (u, v) and that the corresponding plane of the outer box is indexed with coordinates (s, t).

Alternatively, the Lumigraph could be considered as six 2-dimensional image arrays, with all the light rays coming from a fixed (s, t) coordinate forming one image, which is equivalent to setting a camera at coordinate (s, t) and taking a picture of the object where the imaging plane is the (u, v) plane.

In either case, a plurality of Lumigraph images can be taken to produce a Lumigraph image array. Since neighboring Lumigraph images within the array will tend to be very similar to one another, to create a new view of the object, the IBR system can simply split the view into its light rays by interpolating nearby existing light rays in the Lumigraph image arrays.

In this manner, the Lumigraph is attractive because it has information of all views of the objects/scenes. With the Lumigraph, a scene can be rendered realistically regardless of the scene complexity and fast as compared with a top-notch graphic rendering algorithm such as ray tracing algorithm.

Unfortunately, the Lumigraph typically requires a very large amount of data. For example, a typical Lumigraph scene may include 32 sample points in each axis on the (s, t) plane, and 256 sample points in each axis on the (u, v)

plane, with 3 color samples per light ray (e.g., 8-bits of red data, 8-bits of green data, and 8-bits of blue data), and 6 parallel image planes of the object. Thus, for such a relatively low resolution Lumigraph (note that the object resolution is that of the (u, v) plane, which is only 256×256 sample points), the total raw data amount is:

Total Lumigraph Data=32×32×256×256×3×6=1.125 GB.

Such a large Lumigraph data file would be impracticable for storage on a hard drive, optical disc, etc., or for transmission over a communication network, such as, for example, the Internet. Moreover, practical Lumigraph applications will likely require better resolution through a higher sampling density, which would result in even larger Lumigraph data files.

Consequently, there is an on-going need to reduce the size of the Lumigraph data file. One method is to compress the Lumigraph data. Since the Lumigraph data consists of an array of images, therefore, one might think that compression techniques that have been successfully applied to video coding might be applicable to provide Lumigraph data compression. Unfortunately, this is not necessarily so, because there are distinct differences between video and the Lumigraph. For example, the Lumigraph is a 2-dimensional image array, while video is a 1-dimensional array (i.e., a sequence of frames). Thus, there tends to be more of a correlation in the Lumigraph than in the video sequences. Furthermore, unlike video, views rendered using the Lumigraph tend to be more static as presented to the viewer. As is well known, for most viewers, distortion is more noticeable in static images than in moving images. Since a rendered view of the Lumigraph is a combination of the image arrays, certain human visual system (HVS) properties, such as, spatial and temporal masking, may not be used.

Another difference can be seen during the rendering of a compressed bitstream. For a compressed video bitstream, the bitstream is decompressed allowing it to be displayed frame by frame. To the contrary, a compressed Lumigraph bitstream would not be decompressed and then rendered in such a manner, because the decompressed Lumigraph data file would tend to be too large.

It is therefore essential to maintain the Lumigraph data in the compressed form, and decompress/decode only the content needed to render the current view. As used herein, this concept will be referred to as "just-in-time" (JIT) rendering.

JIT rendering is an important feature to the design of a practical Lumigraph compression scheme. Preferably, the JIT rendering will be accomplished by a Lumigraph decoder that is designed to be sufficiently fast enough to accommodate real-time decompression/decoding of the Lumigraph data.

One potential way to accommodate JIT rendering is to compress the Lumigraph data using intraframe coding. Here, the Lumigraph data is segmented into blocks that are compressed independent of one another. For example, Levoy et al. proposed a vector quantization (VQ) approach to compress the Lightfield, and Sloan et al. proposed to use JPEG (i.e., a block discrete cosine transform (DCT) function with run-level Huffman coding) to compress the Lumigraph.

While both VQ and JPEG techniques are relatively fast during decoding, the compression performance is limited. For example, the resulting image quality appears acceptable at a low compression ratio of between about 25:1 and 50:1, however, the quality of the rendered scene degrades quickly thereafter for compression ratios higher than about 50:1.

Considering the large amount of Lumigraph data and high redundancy of information contained therein, there is a continuing need for improved IBR compression methods and arrangements.

Recently, at least two articles have proposed the use of an MPEG like algorithm to compress the Lumigraph data array. The first article, written by Kiu et al., is entitled "Two-Dimensional Sequence Compression Using MPEG" and was published in Visual Communication And Image Processing (VCIP'98) in January 1998. The second article, written by Magnor et al., is entitled "Adaptive Block-Based Light Field Coding," and was published in the Proc. 3rd International Workshop on Synthetic and Natural Hybrid Coding and Three-Dimensional Imaging IWSNHC3DI'99 in September 1999. While each of these articles presents a compression technique that appears to provide higher compression ratios, neither article addresses the continuing problem of rendering the compressed Lumigraph scene, which as described above is of crucial importance to the overall Lumigraph application.

Consequently, there is a need for improved methods and arrangements that can be implemented to compress IBR data, store and/or transport the compressed IBR data, and subsequently provide selective and/or JIT rendering of an image based on at least a portion of the compressed IBR data.

SUMMARY

The present invention provides improved methods and arrangements for compressing IBR data, storing and transporting the compressed IBR data, and subsequently providing selective and JIT rendering of an image based on at least a portion of the compressed IBR data.

For example, in accordance with certain aspects, a multiple reference frame structure (MRF) compression/decompression technique is provided. For image arrays, this MRF technique significantly outperforms the intraframe compression schemes such as VQ or JPEG, yet still provides JIT real time rendering, which is not supported in a video-like coder. This MRF technique also outperforms JPEG compression at least two times. A two-level indexing mechanism is included within the resulting MRF compressed bitstream so that the image may be stored/transported and rendered just in time, with the content needed to render the current view decoded and accessed in real-time.

With this in mind, the above stated needs and others are met by a method for compressing an image data array having image data associated with a plurality of frames. The method includes selectively dividing the frames into anchor frames and predicted frames, independently encoding each of the anchor frames, and encoding a prediction residue for each of the predicted frames. Here, the prediction residue is determined by referring each of the predicted frames to at least two of the anchor frames.

The anchor frames can be staggered to form a pattern within the image data array. For example, a grid pattern having equal distances between neighboring anchor frames can be implemented. This allows for at least one predicted frame to be located between at least two neighboring anchor frames. In certain implementations there are at least three predicted frames located between every two neighboring anchor frames.

The anchor frames can be independently encoded by segmenting each of the anchor frames into a plurality of anchor frame macroblocks, and then encoding each of the anchor frame macroblocks. To encode each of the anchor frame macroblocks, the method may further include subdividing each anchor frame macroblock into a plurality of subblocks, and then transforming each subblock using a discrete cosine transform (DCT) and entropy encoding each transformed subblock using a run-length Huffman coder. For example, in certain implementations, each anchor frame macroblock is subdivided into at least four chrominance subblocks and at least two luminance subblocks.

Encoding the prediction residue for each of the predicted frames includes encoding each of the predicted frame macroblocks using motion compensation. This can be accomplished, for example, for each predicted frame macroblock, by searching in an area within the image data array near the predicted frame macroblock for a significantly best matching anchor frame macroblock, determining a reference vector for each predicted frame macroblock within each predicted frame, and determining a prediction residue for the predicted frame macroblock based on the difference between a predicted frame macroblock value and an anchor frame macroblock value. For each predicted frame macroblock, the method may further include transforming the residue by a discrete cosine transform (DCT), and entropy encoding each transformed residue using a run-length Huffman coder. The predicted frame macroblocks can be encoded using a translation-based motion model, an affine motion model, a perspective motion model, or other like motion models.

The method may further include outputting a bitstream having encoded anchor frame data, encoded predicted frame data, indexing data, and any requisite quantization scale information. The indexing data is configured to identify each encoded anchor frame and each encoded predicted frame. The encoded anchor frame data is further configured to identify encoded macroblocks within each encoded anchor frame, and the encoded predicted frame data is further configured to identify encoded predicted frame macroblocks within each encoded predicted frame A method for decompressing a bitstream is also provided. Here, the bitstream includes encoded anchor frame data, encoded predicted frame data, and indexing data associated with a compressed image data array having image data associated with a plurality of frames. The method includes accessing the index data to identify a unique location for each encoded anchor frame within the encoded anchor frame data, and a unique location for each encoded predicted frame within the encoded predicted frame data. Each encoded anchor frame includes additional indexing information that identifies the location of each encoded anchor frame macroblock therein. Similarly, each encoded predicted frame includes additional information that identifies the location of each encoded predicted frame macroblock therein.

For each new view to be rendered, the method includes determining which encoded anchor frame macroblocks and encoded predicted frame macroblocks are to be used in rendering the new view, selectively decoding the encoded anchor frame macroblock to be used in rendering the new view and those to be referred by the predicted frame macroblock, and selectively decoding the predicted frame macroblock.

In certain implementations, the encoded anchor frame macroblocks are decoded by determining if the encoded anchor frame macroblock has an existing corresponding decoded anchor frame macroblock, and if so, using the existing corresponding decoded anchor frame macroblock in rendering the new view. Otherwise, the method includes decoding the encoded anchor frame macroblock to be used in rendering the new view. Similarly, to selectively decode the predicted frame macroblock the method further includes determining if the encoded predicted frame macroblock has an existing corresponding decoded predicted frame macroblock, and if so, using the existing corresponding decoded predicted frame macroblock in rendering the new view. Otherwise, the method includes decoding the predicted frame macroblock using all referenced decoded anchor frame macroblocks for the predicted frame macroblock. This may require that additional anchor frame macro blocks be decoded first.

The method can determine which encoded anchor frame macroblocks and encoded predicted frame macroblocks are to be used in rendering the new view by splitting the new view into a plurality of rays, wherein each ray passes through two parallel planes, and identifying an intersecting coordinate for each ray that locates which encoded anchor frame macroblocks and encoded predicted frame macroblocks are to be used in rendering the new view with respect to the compressed image data array. In some cases this requires a bilinearly interpolation process using a portion of the plurality of rays to calculate the intersecting coordinate.

Once an anchor frame or predicted frame macroblock has been decoded, it can be saved to memory and used again, as required. In certain implementations, logically separate cache memories are used and managed to allow for quick response and improved performance.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
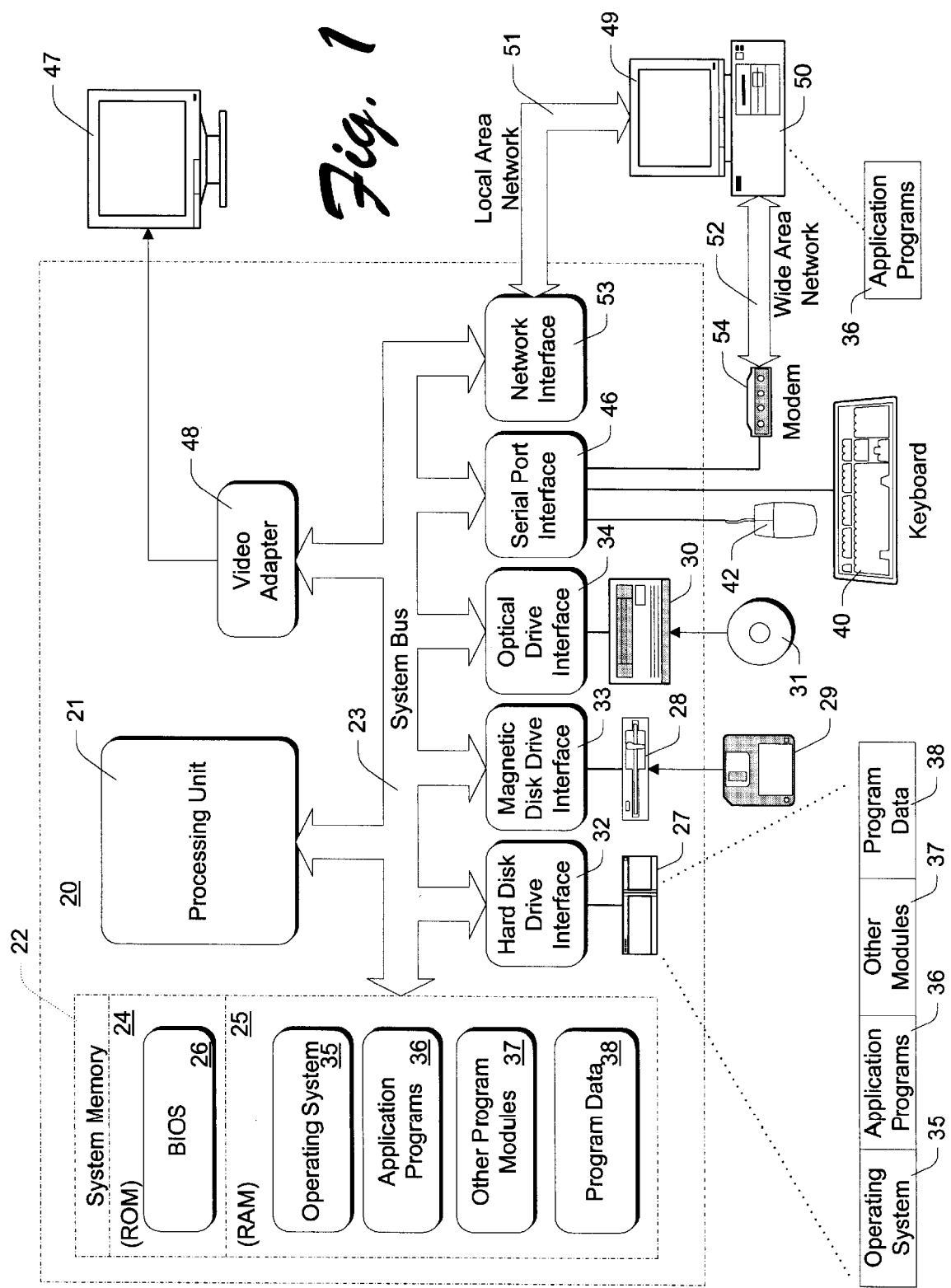
FIG. 1 is a block diagram depicting an exemplary computer system arrangement that can be used to compress image-based rendering (IBR) data, store/transport compressed IBR data, and provide selective/just in time rendering of an image based on at least a portion of the compressed IBR data.

Reference is made to FIG. 1, which is a block diagram depicting an exemplary computer system arrangement that can be used to compress image-based rendering (IBR) data, store/transport compressed IBR data, and provide selective/just in time rendering of an image based on at least a portion of the compressed IBR data. Those skilled in the art will recognize that other arrangements and configurations may also be used for the same purpose.

As shown in FIG. 1, computer 20 includes one or more processors or processing units 21, a system memory 22, and a bus 23 that couples various system components including the system memory 22 to processors 21. Bus 23 represents one or more of any of several types of bus structures, including a memory bus or memory controller, a peripheral bus, an accelerated graphics port, and a processor or local bus using any of a variety of bus architectures.

The system memory includes read only memory (ROM) 24 and random access memory (RAM) 25. A basic input/output system (BIOS) 26, containing the basic routines that help to transfer information between elements within computer 20, such as during start-up, is stored in ROM 24.

Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM, DVD ROM or other optical media. The hard disk drive 27, magnetic disk drive 28 and optical disk drive 30 are each connected to bus 23 by applicable interfaces 32, 33 and 34, respectively.

The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to bus 23.

A monitor 47 or other type of display device is also connected to bus 23 via an interface, such as a video adapter 48. In addition to the monitor, personal computers typically include other peripheral output devices (not shown) such as speakers and printers.

Computer 20 can operate in a networked environment using logical connections to one or more remote computers, such as a remote computer 50. Remote computer 50 may be another personal computer, a server, a router, a network PC, a peer device or other common network node, and typically includes many or all of the elements described above relative to computer 20. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, computer 20 is connected to the local network 51 through a network interface or adapter 156. When used in a WAN networking environment, computer 20 typically includes a modem 54 or other means for establishing communications over the wide area network 52, such as the Internet. Modem 54, which may be internal or external, is connected to bus 23 via interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
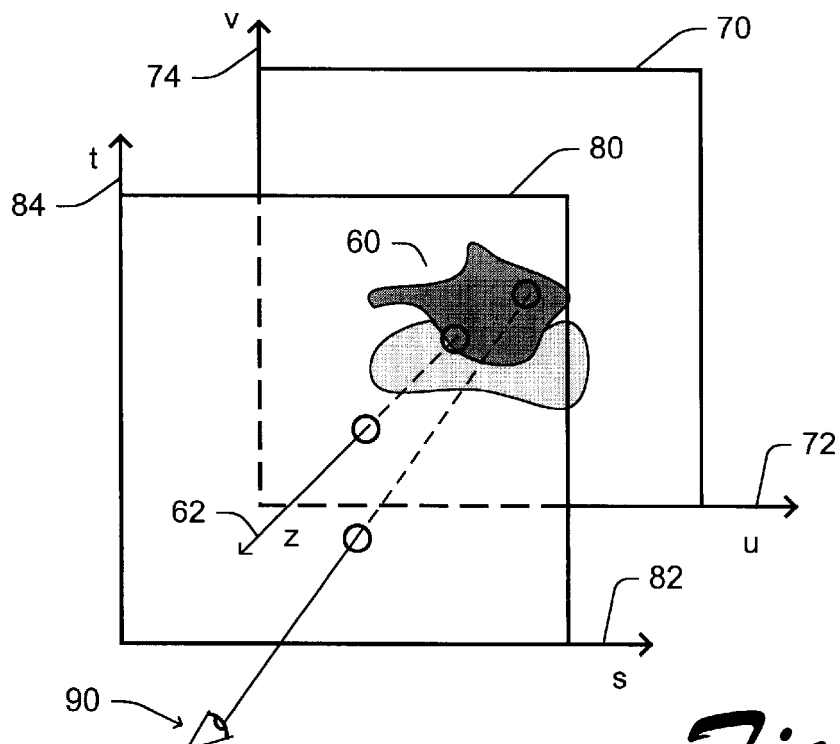
FIG. 2 is an illustration of an exemplary Lumigraph data structure that is suitable for use in the computer system arrangement of FIG. 1.

FIG. 2 is an illustration of an exemplary Lumigraph data structure that is suitable for rendering by computer 20. As depicted, an object 60 is positioned at a particular point in space. In this example, object 60 is considered as being present within a square cube having six sides. The full Lumigraph is constructed from information relating to these six sides. For illustration purposes, only one side is shown here as uv plane 70, which is a simple parameterization of the cube face with orthogonal axes (72 and 74) labeled u and v, respectively, running parallel to the sides of the cube.

Direction is parameterized using a second plane, namely, st plane 80, which is parallel to the uv plane 70 with axes (82 and 84) labeled s and t, respectively. Any point in the 4-dimensional Lumigraph can therefore be identified by its four coordinates (s, t, u, and v), which can be the coordinates of a ray piercing st plane 80 and intersecting uv plane 70. By placing the origin at the center of uv plane 70, with the z-axis 62 normal to uv plane 70, the st plane 80 can be located at z=1. As a result, the full Lumigraph consists of six such pairs of planes with normals along the x, -x, y, -y, z, and -z directions.

Figure 3:
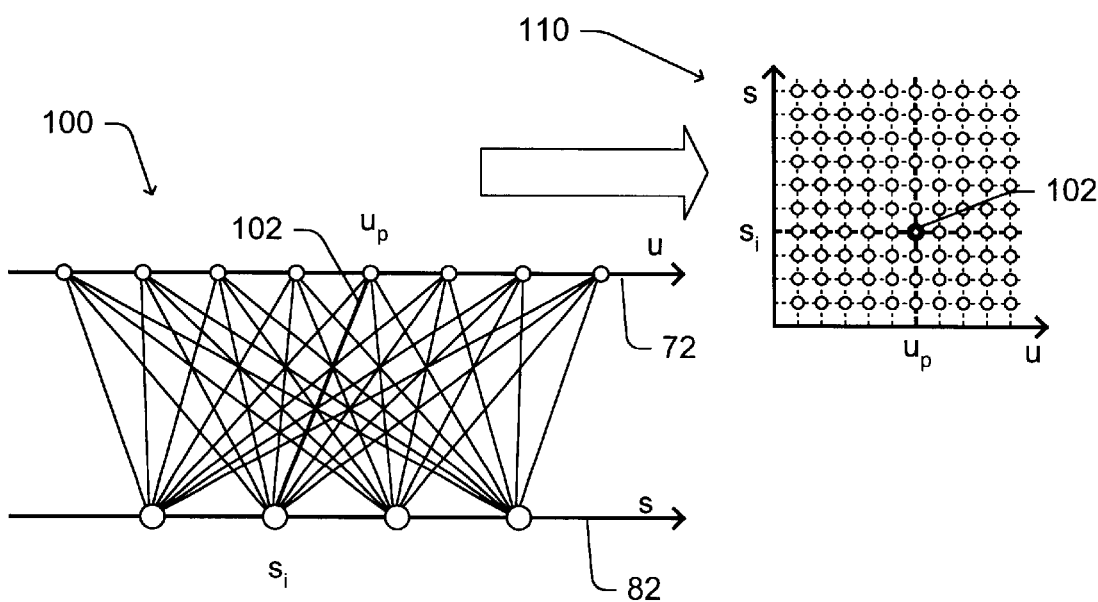
FIG. 3 contains two related graphs depicting the digitization of a 2-dimensional Lumigraph from a grid point (first graph) to a 2-dimensional ray space (second graph).

With this in mind, FIG. 3 contains two related graphs 100 and 110 depicting the digitization of a 2-dimensional Lumigraph from a grid point (in graph 100) to a 2-dimensional ray space (in graph 110). Graph 100 depicts a two-dimensional slice of the 4-dimensional Lumigraph as indicated by u axis 72 and s axis 82. Here, rays are depicted as passing between discrete sample or grid points on each axis. Here, an st grid point is indexed with (i, j) and is located at (si and tj). A uv grid point is indexed with (p, q) and is located at ($u_p$ and $v_q$). For example, ray 102 passes through points $s_i$ and $u_p$. A 4-dimensional grid point is indexed (i, j, p, q). The data value at such a grid point is a red-green-blue (RGB) triple and is referred to as $x_{i,j,p,q}$.

Graph 110 depicts the same arrangement with ray 102 highlighted (bold), in two-dimensional ray coordinates in which rays are mapped to points and points are mapped to lines.

Thus, given a Lumigraph, one can generate an arbitrary new view of the object. We may split the new view into light rays, where each light ray is colored with the appropriate Lumigraph value L(s, t, u, v). A light ray 90 is shown in FIG. 2. Each ray can be considered a sample of the Lumigraph value at (s, t, u, v) that can be used to construct the Lumigraph.

For additional background on the Lumigraph and other IBR techniques, as well as MPEG techniques, the reader is referred to the following references, which further describe certain IBR schemes such as the Lumigraph and the Lightfield. Each of the following articles is expressly incorporated by reference in this description in their entirety and for all purposes.

1) Adelson et al., "The Plenoptic Function And The Elements Of Early Vision", Computational Models of Visual Processing, Chapter 1, Edited by Michael Landy and J. Anthony Movshon. The MIT Press, Cambridge, Mass. 1991.

2) McMillan et al., "Plenoptic Modeling: An Image-Based Rendering System", Computer Graphics (SIGGRAPH'95), pp. 39–46, August 1995.

3) Gortler et al., "The Lumigraph", Computer Graphics (SIGGRAPH'96), pp. 43, August 1996.

4) Levoy et al., "Light Field Rendering", Computer Graphics (SIGGRAPH'96), pp. 31, August 1996.

5) Huang et al., "Motion And Structure From Feature Correspondences: A Review", Proc. of the IEEE, Vol. 82, No. 2, pp. 252–268, February 1994.

6) Li et al., "Image Sequence Coding At Very Low Bitrates: A Review", IEEE Trans. on Image Processing, Vol. 3, No. 5, pp. 589–608, September 1994.

7) Park et al., "Estimation Of Camera Parameters From Image Sequence For Model-Based Video Coding", IEEE Trans. on Circuits and Systems for Video Technology, Vol. 4, No. 3, pp.288–296, June 1994.

8) Mitchell et al., "MPEG Video: Compression Standard", Chapman & Hall, 1996.

9) Sanson, "Motion Affine Models Identification And Application To Television Image Coding", SPIE symp. Visual Communications and Image Processing 91, Vol. 1605, pp. 570–581, 1991.

10) Tsai et al., "Estimation Three-Dimensional Motion Parameters Of A Rigid Planar Patch", IEEE Trans. Acoust., Speech, Signal Processing, Vol. ASSP-29, pp. 1157–1162, December 1981.

11) Jozawa et al., "Two-Stage Motion Compensation Using Adaptive Global MC And Local Affine MC", IEEE Trans. on Circuits and Systems for Video Technology, Vol. 7, No. 1, February 1997.

12) Kiu, et al., "Two-Dimensional Sequence Compression Using MPEG", in Visual communication and image processing (VCIP'98), pp. 914–921, January 1998.

13) Magnor et al., "Adaptive Block-Based Light Field Coding," Proc. 3rd International Workshop on Synthetic and Natural Hybrid Coding and Three-Dimensional Imaging IWSNHC3DI'99, Santorini, Greece, pp. 140–143, September 1999.

14) Delp et al., "Image Compression Using Block Truncation Coding", IEEE trans. Communication, Vol. COM-27, No.9, pp.1335–1342, September 1979.

A multiple reference frame (MRF) structure will now be described to advantageously compress a Lumigraph or like image array. One of the features of one such an MRF structure is that JIT rendering can be conducted using the resulting highly compressed Lumigraph scene, which is predictively encoded.

Those skilled in the art will recognize that, at first glance, the MRF structure appears similar to certain video coding standards such as MPEG or H.26x. As will be shown, when using MRF methods and arrangements the image array in the Lumigraph scene is classified into two categories—an anchor (A) frame that is independently encoded, and a predicted (P) frame that is referred to a nearby (but not necessarily the closest) anchor frame through motion compensation and predictively encoded.

Considering the 2-dimensional image array structure of the Lumigraph, the P frame in MRF may refer, for example, to any one of four neighboring A frames. Unlike MPEG, however, in the MRF scheme a P frame refers only to an A frame, not to another P frame. This insures that access to an arbitrary frame is handled reasonably fast during the rendering stage.

As described below, the resulting compressed Lumigraph bitstream is designed with a two-level hierarchy index structure to enable random access of the compressed bitstream.

In still other advances, certain MRF methods and arrangements further include a decoder cache configured to buffer content that has been decoded. Thus, an MRF Lumigraph coder not only significantly improves the compression performance of the Lumigraph, but also spares the decoder from having to buffer an entire decoded Lumigraph. This supports Lumigraph browsing over the Internet or other like communication services/networks, since the coder has a high compression ratio and only decodes the necessary content to render the current view.

For simplicity, this description will focus on the compression and rendering of one of the six image arrays of the Lumigraph. It should be understood, however, that the described methods and arrangements are easily extended to a full 3D view of the Lumigraph or any like IBR dataset.

First, an exemplary MRF compression scheme will be described along with the two-level hierarchy index structure of the compressed bitstream. Later sections describe an exemplary JIT rendering scheme using the decoder cache, and present experimental (simulation) results and conclusions.

Figure 4:
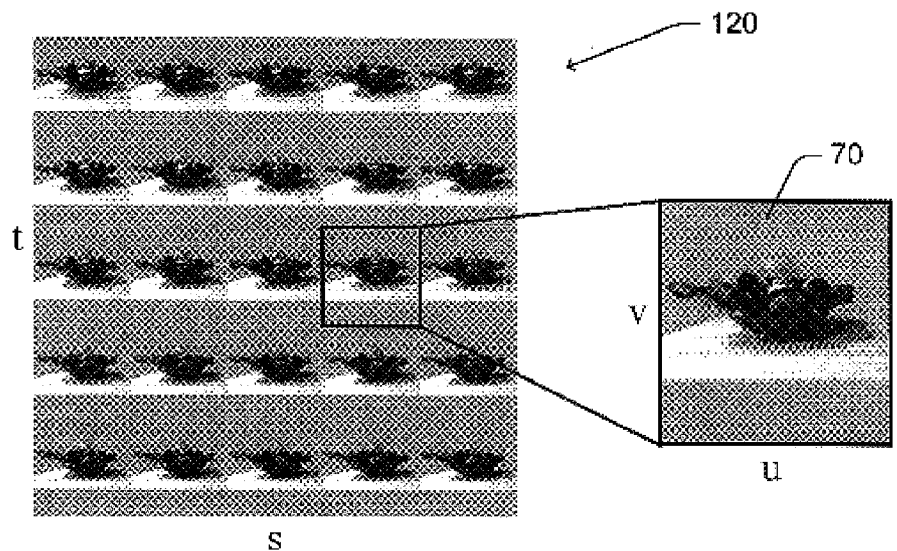
FIG. 4 illustrates a 4-deminsional Lumigraph data structure in the form of captured image data in an array.

FIG. 4 illustrates a 4-deminsional Lumigraph data structure in the form of captured image data 70 in an array 120. As depicted in this example, different views of a fruit plate where captured using a digital color camera.

Figure 5:
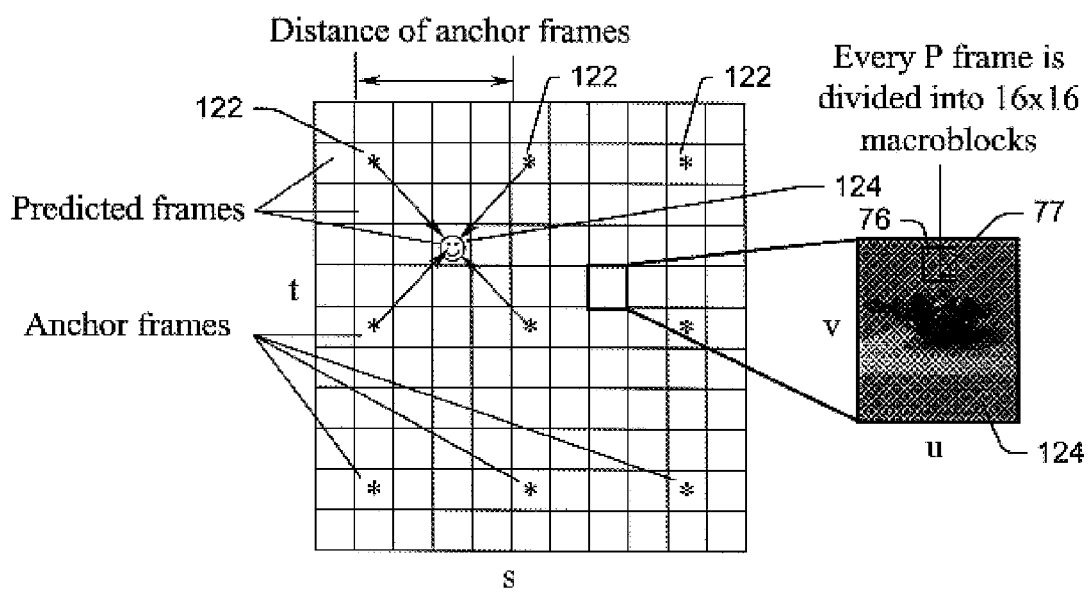
FIG. 5 illustratively depicts a Lumigraph data structure, for example, as in FIG. 4, as having a plurality of anchor (A) frames and a plurality of predicted (P) frames.

The framework of the multiple reference frame (MRF) structure is shown in FIG. 5, which is meant to represent a superset to FIG. 4. Here, the Lumigraph is a 2-dimensional image array indexed by coordinates (s,t), with pixels inside each image indexed by coordinates (u,v). The 2-dimensional image array is shown in the left part of FIG. 5, wherein each box represents one image or frame. As depicted, certain frames are selected as the reference or anchor (A) frames 122. The remaining images are predicted (P) frames 124, which refer to at least one of the A frames 122 through motion compensation.

Each A frame 122 is independently encoded, while only the prediction residue of each P frame 124 is encoded. In certain implementations, for example, A frames 122 are located on a regular grid pattern in the (s,t) plane, as shown by frames marked with symbol "*" in FIG. 5.

Thus, both A frames 122 and P frames 124 are segmented into square blocks and each block is encoded independently into a unit bitstream. In certain implementations, the size of the square block is 16×16 and referred to as a macroblock (MB) 76, for its similarity with the macroblock used in JPEG and MPEG. The size of the MB 76 is a compromise between access granularity, the processing overhead spent on each MB (e.g., motion vectors and index information), and/or motion compensation efficiency.

Each A frame 122 is encoded independently, MB by MB. Each MB 76 can be further divided into six 8×8 subblocks 77, consisting of four luminance subblocks and two chrominance subblocks. Here, in this example, each of the two chrominance subblocks has been subsampled by a factor of two in both the horizontal and vertical directions.

The subblocks are transformed by a basis-8 discrete cosine transform (DCT), quantized by an intra Q-table with a quantization scale $Q_A$, and then entropy encoded by a run-level Huffman coder. Thus, the procedure of MB coding can be, for example, the same as MPEG I frame coding. Although not the best in terms of compression performance, the DCT and Huffman algorithm can be quickly inversed so that the MB 76 can be decoded quickly.

The quantization parameter $Q_A$ determines the bitrate and quality of A frame coding. The larger the value $Q_A$, the higher the compression ratio, however, the poorer the quality of the reconstructed A frames. The quantization tables and Huffman tables used in MRF coding can be the same as those in MPEG-2, for example.

The MB of each P frame 124 may refer to multiple A frames 122, hence the name multiple reference frame (MRF) prediction. In FIG. 5, for example, P frame 124 having the symbol "☺" has four references which are the A frames 122 with arrows pointing to the P frame 124 having the symbol "☺." As mentioned, preferably a P frame 124 only refers to A frames 122, not to another P frame.

The P frame 124 is also split into MBs, and each MB 76 is encoded using motion compensation. For each MB 76, a search is conducted in an area around the current position of the MB and in its four reference A frames 122 to determine the best matching MB. A true best match should minimize the coding length and distortion of the residue error, however since such a search tends to be computationally intensive, a simple criterion, e.g., the minimum mean square error (MSE) criterion that minimizes the energy of the difference between the current MB and the matching one may be employed.

A reference vector is generated for each MB 76 of the P frame 124, indicating the position of the matching MB 76 and its reference frame (e.g., one of the neighboring A frames 122). Next, the difference between the current MB 76 and its matching one, i.e., the prediction residue, is encoded again through an 8×8 DCT, an inter Q-table quantization with controlling parameter $Q_P$, and a run-level Huffman coding.

Here, the operation is similar to MPEG P frame coding, except that a MPEG P frame has only one reference frame, and the reference frame may be either an I or a P frame. By enabling multiple A frames 122 as references, there is an improvement in the prediction efficiency with only a price of two additional bits per MB 76 for indexing purposes. The overhead for using the multiple reference frames may be reduced to even more than one bit by Huffman encoding the index of the reference frame, because the nearest A frame is more likely to be the best reference.

Furthermore, by referring the P frames 124 only to the A frames 122 there is an attendant reduction in the number of frames that need to be decoded to render an arbitrary Lumigraph view. As described in greater detail below, such easy data access allows for JIT rendering of the Lumigraph scene.

Conventional translation-based motion models can be employed as dictated by the processing constraints. There are more advanced motion models, however, that can be incorporated in the various methods and arrangements described herein, such as, for example, the affine motion model and the perspective motion model. While these models achieve more accurate motion compensation, they tend to add coding overhead for the motion parameters and increase the complexity in obtaining the parameters.

Figure 6:
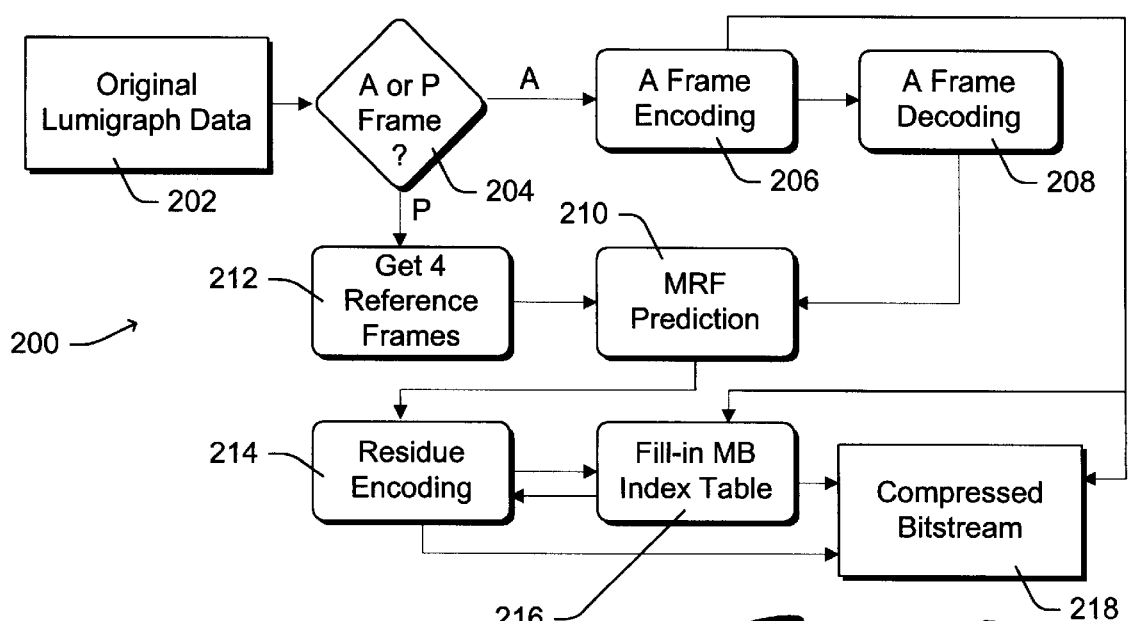
FIG. 6 is a flow chart depicting an exemplary multiple reference frame (MRF) structure encoding process that produces a compressed bitstream having a plurality of anchor (A) frames and a plurality of predicted (P) frames therein.

An exemplary Lumigraph compression process 200 with MRF prediction is depicted in FIG. 6. In step 202, an original Lumigraph image array is provided along with quality control parameters $Q_A$ and $Q_P$. In step 204, a determination is made as to whether the frame is to be an A frame 122 or a P frame 124. In process 200, the A frames are encoded first, as shown in step 206. The resulting compressed A frames are then decoded in step 208 and the resulting decompressed A frames are provided to step 210 and used as references for P frame encoding. Steps 206 and 208 are necessary because the subsequent decoding/rendering computer will only have access to compressed A frames, rather than to the original A frames.

In step 212 the four (or K number) of A frames are selected for frames designated in step 204 as being P frames 124. The P frames are then encoded in steps 210 and 214, with each macroblock MRF being predicted and its residue being compressed. All of the compression results from steps 206 and 214 are then fed into a bitstream, in step 218, along with a two-level hierarchical index table as generated in step 216. This "index table" is preferably designed to promote random access to selected frames during subsequent decoding.

Figure 8:
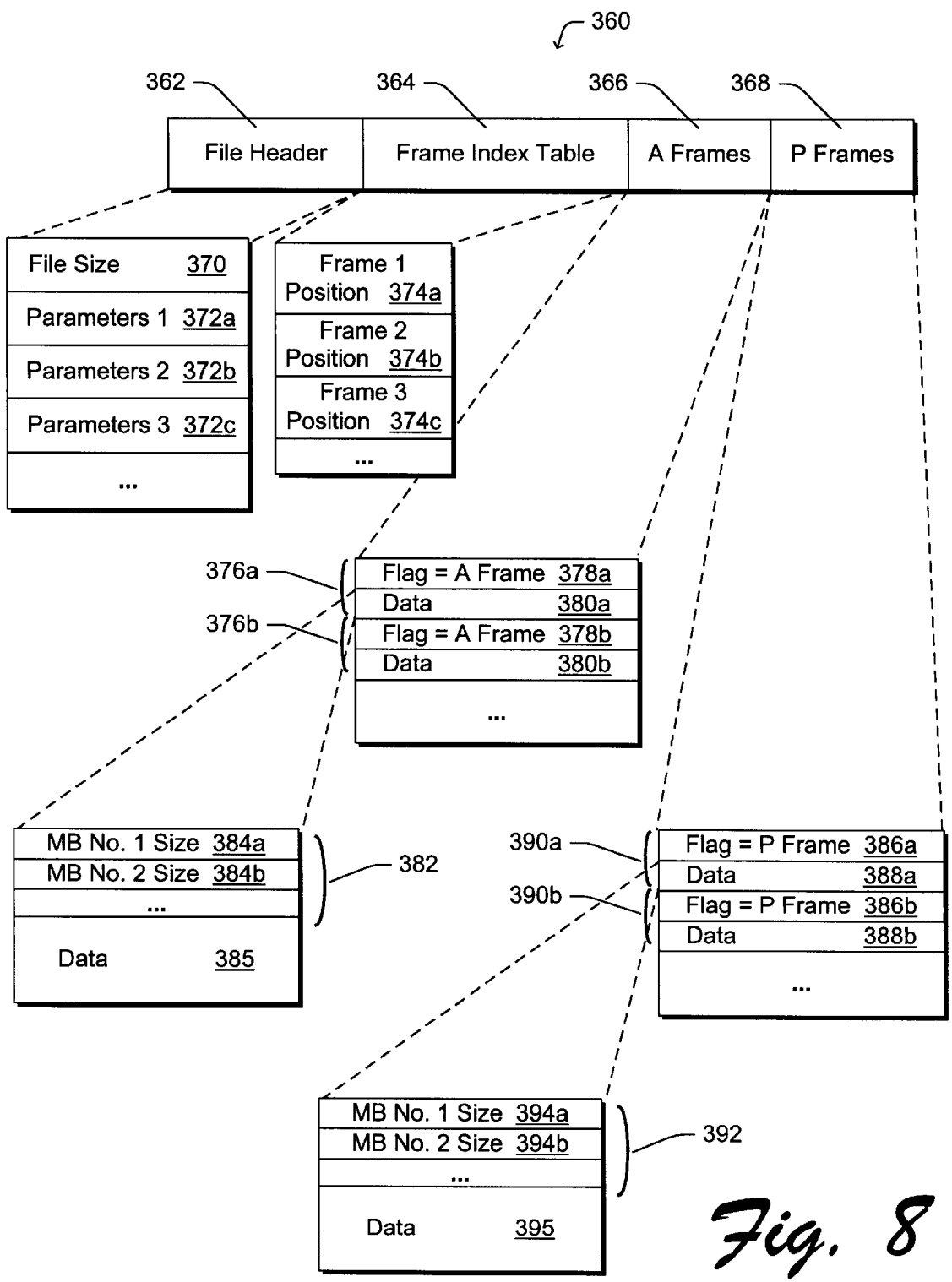
FIG. 8 illustratively depicts an exemplary compressed bitstream having a plurality of anchor (A) frames and a plurality of predicted (P) frames, for example, as generated by the multiple reference frame (MRF) structure encoding process of FIG. 6.

Reference is now made to FIG. 8, which graphically depicts an exemplary compressed bitstream 360 as generated in step 218. As shown, bitstream 360 includes a file header 363, a frame index table 364, and A frame data 366 and P frame data 368. File header 362 defines the file size 370 associated with the compressed bitstream, and provides a plurality of parameters 372 associated with the resolution of the Lumigraph (s, t, u, v) and scale as required to define the distance between A frames 122.

The first level of the index table is provided in frame index table 364. Frame index table 364 includes frame position indicators 374, which define the location of each frame's data within the bitstream. For example, frame position indicators 374a–c may include offsets from file header 362 that define the location/length of each A or P frame.

The A frame data 366 includes separate fields 376 for each A frame 122. Field 376a, for example, includes a flag 378a that identifies data 380a as being A frame data. The location of field 376a may be defined, for example, by frame position indicator 374a. Data 380a further includes a MB index table 382 indicating the location or size 384 of each of the MBs within the respective A frame 122. Data 380a also includes the MB data 385 as identified by MB index table 382.

Similarly, P frame data 368 includes separate fields 390 for each P frame 124. Field 390a, for example, includes a flag 386a that identifies data 388a as being P frame data. The location of field 390a may be defined, for example, by frame position indicator 374b. Data 388a further includes a MB index table 392 indicating the location or size 394 of each of the MBs within the respective P frame 124. Data 388*a* also includes the MB data 395 as identified by MB index table 392.

Thus, MB index tables 382/392 are essentially a second level index table that is stored within the bitstream of each compressed frame. In this example, MB index tables 382/ 392 record the compressed bitstream length of each individual MB.

With frame index table 364 and MB index tables 382/392, a decoder is able to locate and randomly access compressed bitstream 360 of any MB 76 of any A frame 122 or P frame 124.

The overhead added by such a two-level index table is not trivial, especially at relatively high compression ratios. For example, certain implementations incur a table overhead equal to approximately 10% of the entire bitstream when the compression ratio is 100:1. The overhead increases to 30% when the compression ratio reaches 160:1. Nevertheless, significantly improved, high compression performance can be achieved using the MRF techniques when compared other known methods.

Compressed bitstream 360 can then be transported or otherwise provided to a decoding computer. Since the decoding computer can randomly access compressed bitstream 360, and in the rendering of any view, only partial Lumigraph data are accessed, there is no need to decode the entire Lumigraph scene any specific time during the rendering process. Only the data necessary to render the current view are accessed and decoded, interpolated and rendered on the screen. The concept is termed just-in-time (JIT) rendering.

JIT rendering significantly reduces the amount of memory required to render the Lumigraph scene. JIT rendering also speeds up the Internet browsing of the Lumigraph as only the compressed data corresponding to the current view needs to be streamed over the Internet.

The implementation of JIT rendering is simpler for compression algorithms that involve only local block access, such as the spatial domain vector quantization (VQ) or the block truncation coding (BTC) in which the compression performance is limited.

Here, JIT rendering is implemented first time for a high compression ratio Lumigraph codec with frame prediction. To facilitate JIT rendering, the two-level hierarchy index table described above is used to access those MBs that are needed. In accordance with certain implementations, a variable-sized cache is established within computer memory 22 (see FIG. 1) to separately store A frame 122 and P frame 124 data so that data, which has already been decoded, does not need to be decoded again and again. This further facilitates the JIT rendering process.

Figure 7:
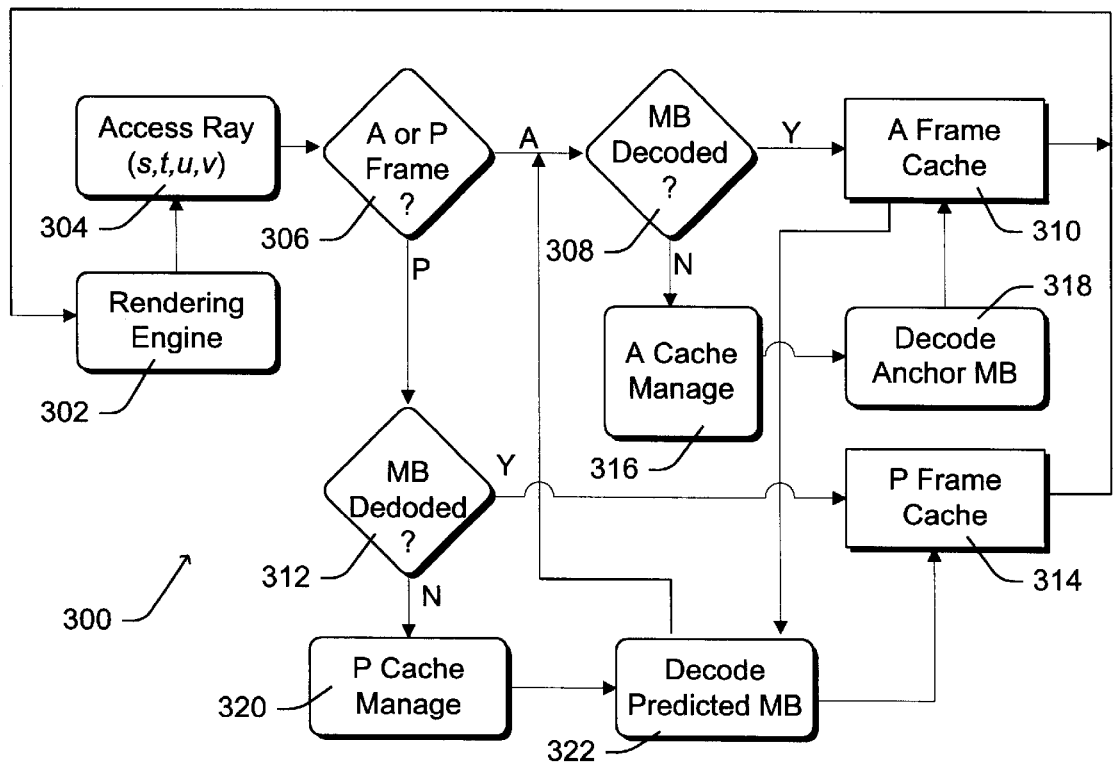
FIG. 7 is a flow chart depicting an exemplary just in time (JIT) decoding process that renders images using a plurality of anchor (A) frames to predict macroblock information, as required, in predicted (P) frames.

FIG. 7 flow chart depicting an exemplary decoding and JIT rendering process 300 that renders IBR views from the bitstream output by step 218. Process 300 is essentially driven by a rendering engine, in step 302. When process 300 is launched, the two-level hierarchy index table is first accessed from the bitstream and decoded (as required). When a new view request is received from the user or other program in step 302, the rendering engine splits the view into multiple rays, wherein each ray passes through planes (u,v) 70 and (s,t) 80, and the intersecting coordinate locates the ray in the Lumigraph data set. Since the coordinate may not be integral, the ray is calculated through a 4D bilinear interpolation in the (u,v,s,t) space with at most sixteen rays in the example above. Up until this point, the operation of process 300 has been essentially the same as it would be in any conventional Lumigraph viewer. These sixteen rays are accessed from the Lumigraph decoder in step 304.

As shown in decision steps 306, 308 and 310, for each accessed ray (u,v,s,t), its associated macroblock is located and checked to determine if the macroblock is already decoded and stored in either cache 310 (for A frames) or 314 (for P frames). Thus, if the ray belongs to an A frame, the anchor frame cache 310 is checked, otherwise, the predicted frame cache 314 is checked. If the macroblock is in either cache 310 or 314, then the intensity of the ray is returned to the rendering engine.

Otherwise, the macroblock is decoded from the bitstream with the assistance of the two-level index table, put in the cache and accessed as depicted in steps 316 and 318 for A frames, and steps 320 and 322 for P frames. In steps 316 and 318 the macroblock of the A frame is directly decoded from the compressed bitstream. However, to decode the macroblock of a P frame in steps 320 and 322, its referred macroblock (e.g., at least one of the four in the previous example) in the anchor frame must be, or must have already been, decoded first. Thus, in step 322, it is determined if the referred macroblock is in cache 310. If the referred macroblock is not in cache 310, then it is decoded from the compressed bitstream first and place in cache 310 using steps 308, 316, and 318, as needed. If the referred macroblock is already in cache 310, as determined by step 308, then it is accessed from cache 310 by step 322.

In step 322, after the referred anchor frame macroblock is available, the prediction residue of the current macroblock is decoded and added to the motion compensated macroblock. The resulting decoded P frame macroblock is then stored in the P frame cache 314 for subsequent access.

In certain implementations, the combined size of the total cache (i.e., cache 310 and cache 314) is approximately 800 KB, which is sufficient enough to hold about eight YUV images at a resolution of 256 pixels by 256 pixels. This is only a fraction of the entire Lumigraph data set, which, in this example, is about 200 MB.

Experiments have shown that the requisite cache size tends to grow slower in response to the growing size of the Lumigraph data. If the Lumigraph resolution doubles, one can expect that the Lumigraph data size will increase by sixteen fold, i.e., doubling in direction on each of the u, v, s and t axes. However, the cache size only needs to quadruple, as the cache size is more a factor of the image resolution at the (u,v) plane. Thus, in steps 316 and 320, a random replacement cache strategy is implemented for the management of caches 310 and 314, respectively. Consequently, any time the A frame or the P frame cache is full and a new macroblock is to be decoded, process 300 randomly drops one of the macroblocks in the respective cache to make room for the new macroblock.

To highlight some of the advantages of the MRF structure and JIT decoding as described above, the following exemplary experimental results are provided. In this experiment, a personal computer (PC) was provided with a Lumigraph encoder having an MRF structure and a JIT Lumigraph decoder.

The JIT Lumigraph viewer ran in real-time on the conventional desktop PC, without any further optimization required. The test Lumigraph scene was a head image that was rendered from the visible human project. As mentioned above, the data set is only one of the six parallel planes of the Lumigraph. The sampling resolution of the Lumigraph was 256×256 in the (u,v) plane 70 and 32×32 in the (s,t) plane 80.

Figure 9:
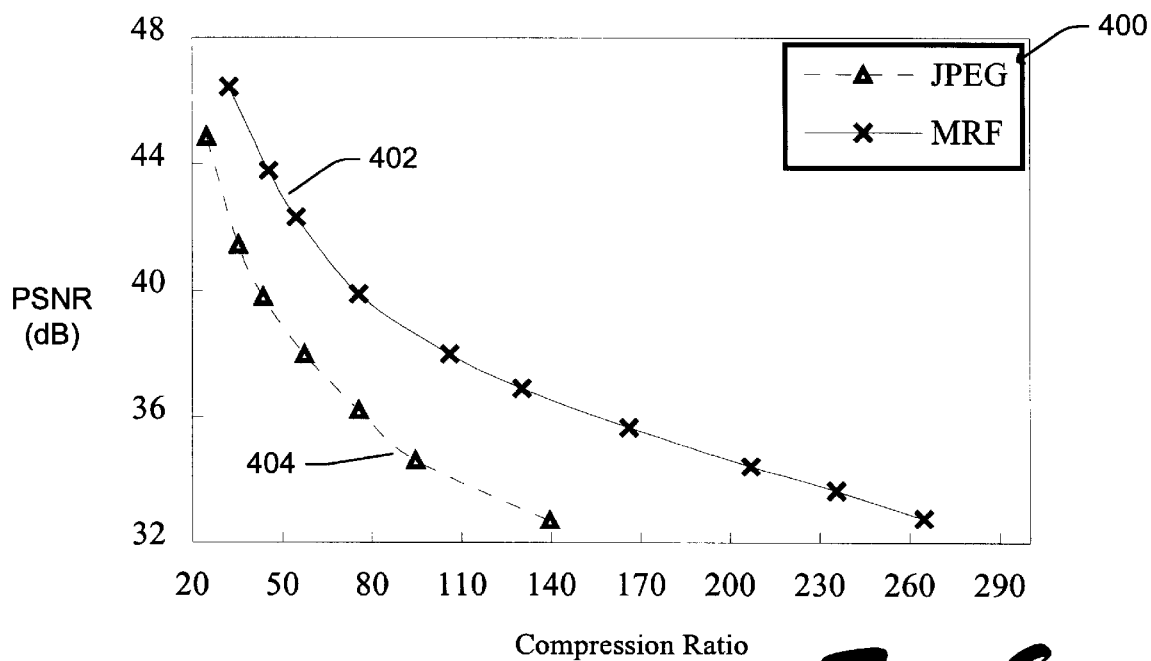
FIG. 9 is a graph depicting exemplary experimental results of the peak signal-to-noise-ratio (PSNR) (dB) for a plurality of compression ratios based on different anchor (A) frame distances.

In one experiment, a comparison was made between the compression efficiency of the MRF structure and JPEG. The results are depicted in graph 400 of FIG. 9. Line 402 represents the MRF structure results and line 404 represents the JPEG results. In this experiment, the rate control was turned off in the MRF compression, i.e., the anchor frame quantization scale $Q_A$ is set to be equal to twice the predicted frame quantization scale $Q_P=2Q_A=2$ Q. The changing of scale Q leads to a MRF compression of different ratio. The overhead of the two-level index table was not considered in this experiment, so that a comparison could be made of the compression performance of MRF and JPEG. The subsampling distance of the anchor frame is 4, thus $1/16^{th}$ of the frames are anchor frames. Shown in graph 400, the horizontal axis is the compression ratio, and the vertical axis is the average peak signal to noise ratio (PSNR), which is calculated as follows:

$$PSNR = 10 \cdot \log_{10} \frac{255^2}{mse}, \text{ with } mse = E\|f(u, v, s, t) - \hat{f}(u, v, s, t)\|^2$$

where mse is the mean square error, and E(.) is the average operation, f and $\hat{f}$ are the original and decoded Lumigraph data set, respectively. A curve towards upper right corner of the figure indicates a larger PSNR at the same compression ratio, and thus a superior compression performance. It is obvious from the figure that the MRF-based Lumigraph compression, line 402, is superior to the algorithm with only intra frame compression, line 404. Indeed, the compression ratio of MRF nearly doubles that of the JPEG compression, especially at high compression ratio.

Figure 10:
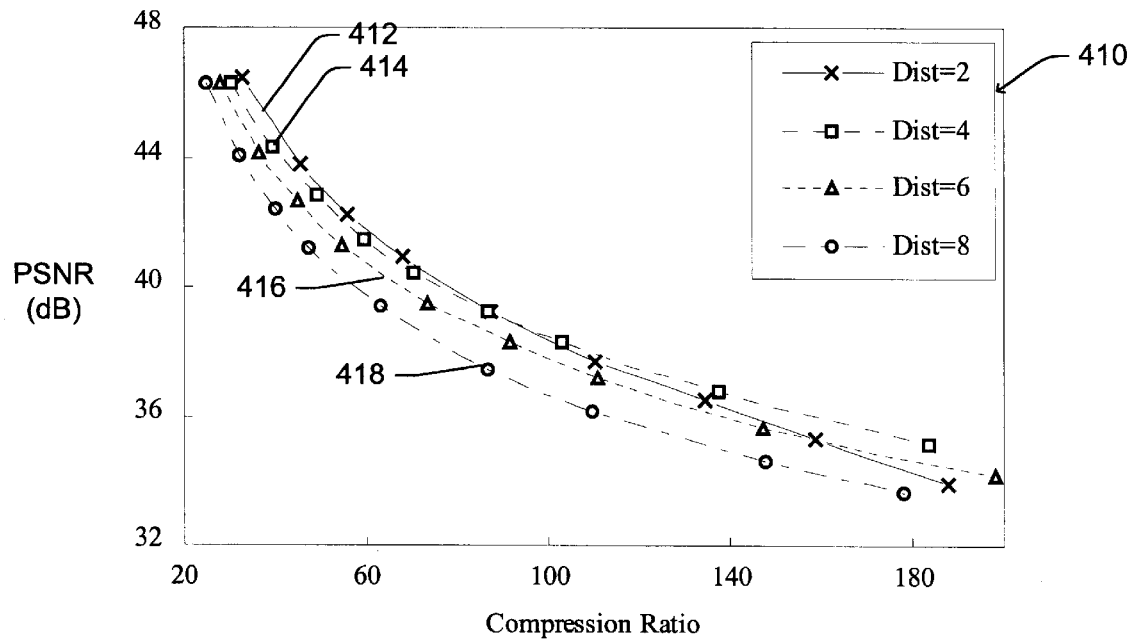
FIG. 10 is a graph depicting experimental results of the PSNR (dB) for a plurality of compression ratios using a JPEG encoding process and an exemplary multiple reference frame (MRF) structure encoding process.

The optimum sampling distance of the A frame was also investigated. The results are depicted in FIG. 10. Here, the test Lumigraph scene was compressed with sampling distances two (line 412), four (line 414), six (line 416), and eight (line 418), with all the other compression control parameters the same. Graph 410 depicts the resulting curved lines by comparing the compression ratio to the PSNR. From this experimental data, it appears that, at least for the visible human head Lumigraph data set, that a sampling distance of two (line 412) is optimum for compression ratio below 80:1, and a sampling distance of four (line 414) is optimum for compression ratio beyond 80:1. Since it is expected that the MRF structure will be used mostly for compression ratios above 80:1, a sampling distance of four (line 414) seemed a good choice for this initial implementation. Of course it is recognized the higher or lower distances may be more suitable for other types of images, hardware, and/or software implementations.

Figure 11:
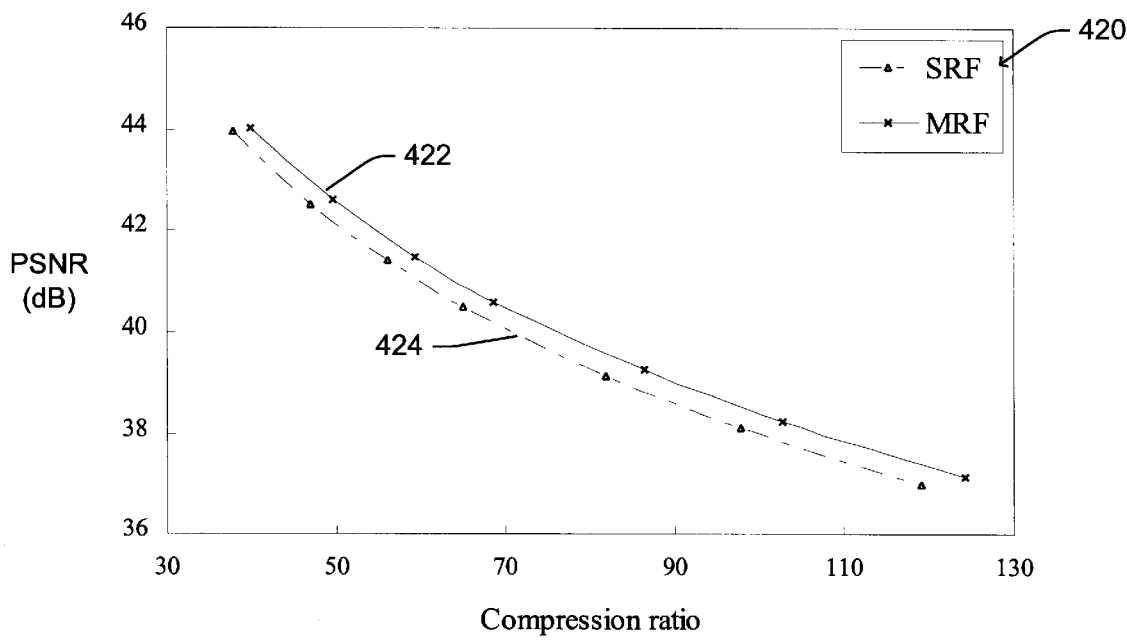
FIG. 11 is a is a graph depicting experimental results of the PSNR (dB) for a for a plurality of compression ratios using a single reference frame (SRF) structure encoding process and an exemplary multiple reference frame (MRF) structure encoding process.

In FIG. 11 a comparison is made between the resulting MRF Lumigraph compression and the resulting single reference frame (SRF) Lumigraph compression. The SRF is essentially MRF wherein each macroblock has only one reference frame that is the closest anchor frame with respect to the current predicted frame. As shown in graph 420, MRF (line 422) outperforms SRF (line 424) for around 0.5 dB in PSNR at the same compression ratio, or 5.6% in compression ratio at the same PSNR. Therefore, the multiple reference frame structure and the 2 additional bits used as reference are justified in MRF Lumigraph compression.

Figure 12:
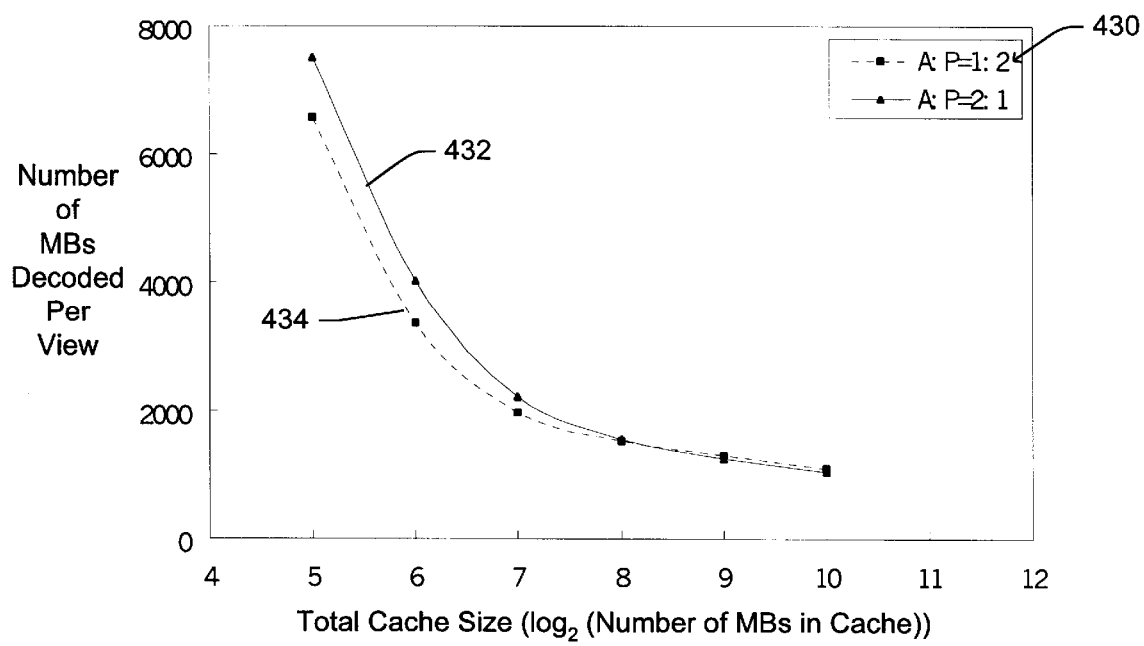
FIG. 12 is a graph depicting experimental results showing the total cache size versus the number of macroblocks (MBs) decoded per view for two different computer configurations.

The size of the macroblock cache versus the decoding speed was also investigated. The results are depicted in graph 430 of FIG. 12. Here, the horizontal axis is the size of the total cache, in terms of the number of macroblocks. Note that the horizontal axis is numbered with a base-2 logarithmic coordinate. Therefore, for example, coordinate 5 stands for $2^5=32$ macroblocks. The vertical axis is the average number of macroblocks newly decoded while rendering a new view. The lower the number of macroblocks decoded per view, the lower the computational complexity. Line 432 corresponds to a cache design with a larger A frame cache 310, with a ratio between A cache 310 and P cache 314 of about 2:1. Line 434 corresponds to a design with a larger P frame cache 314, with a ratio between A cache 310 and P cache 314 of 1:2. As shown, the number of average decoded macroblocks decreases steeply as the cache size increases from 32 (coordinate 5) to 256 (coordinate 8) macroblocks, but the decrease slows down for cache size beyond 256 macroblocks. Also, it appears that it is probably better to allocate larger cache space to the P frames (i.e., cache 314) for a cache size smaller than or equal to 256 macroblocks, and allocate a larger cache to the A frames (i.e., cache 310) for cache size greater than 512 macroblocks. However, with a cache larger than 512 macroblocks, the difference between larger A frame cache 310 and larger P frame cache 314 becomes smaller to the rendering speed. For speed optimization, a cache size of 1024 macroblocks was successfully used in these experiments, which occupies a memory of only about 0.8 MB.

Thus, as can be seen in the MRF Lumigraph compression scheme presented herein significantly outperforms the intraframe Lumigraph compression schemes such as VQ or JPEG, while also allowing for real time, JIT rendering which is not supported in a video-like coder. The MRF Lumigraph compression scheme clearly outperforms JPEG Lumigraph compression as much as two times. The two-level index table, which is inserted into the MRF compressed bitstream, allows the Lumigraph or other like IBR image data to be rendered JIT, with the content needed to render the current view decoded and accessed in real time.

Incorporating additional knowledge about the viewer/ camera leads to further compression/rendering improvements. For example, one of the most important characteristics of Lumigraph is the regular motion of camera between neighbor images. Estimation of the relative camera motion between two image frames has been an important research topic in the areas of computer vision and image coding. By modeling the camera motion with several parameters, better prediction of neighbor images can be achieved, which will lead to a higher compression ratio. Furthermore a multi-resolution structure can be established through a discrete wavelet transform and combined with an advanced entropy coder to provide even better compression performance.

Although some preferred implementations of various methods and arrangements have been illustrated in the accompanying Drawings and described in the foregoing Description, it will be understood that the invention is not limited to the exemplary implementations disclosed, but is capable of numerous rearrangements, modifications and substitutions as set forth and defined by the following claims.

What is claimed is:

1. A method for compressing an image data array having image data associated with a plurality of frames, the method comprising:

selectively dividing the plurality of frames into a plurality of anchor frames and a plurality of predicted frames;

independently encoding each of the anchor frames;

encoding a prediction residue for each of the predicted frames, the prediction residue for each of the predicted frames being determined by referring each of the predicted frames to at least one of the anchor frames; and encoding an index of the anchor frames and the predicted frames, wherein the encoded index is configured to support random access to selected frames during a decoding process.

2. The method as recited in claim 1, wherein selectively dividing the plurality of frames further includes staggering the anchor frames in a pattern within the plurality of predicted frames.

3. The method as recited in claim 2, wherein the pattern is a grid pattern based on an equal distance between neighboring anchor frames.

4. The method as recited in claim 3, wherein the equal distance causes at least one predicted frame to be located between at least two neighboring anchor frames as situated with a two-dimensional image data array.

5. The method as recited in claim 3, wherein the equal distance causes three predicted frames to be located between at least two neighboring anchor frames as situated with a two-dimensional image data array.

6. The method as recited in claim 1, wherein independently encoding each of the anchor frames further includes:
 segmenting each of the anchor frames into a plurality of anchor frame macroblocks; and
 independently encoding each of the anchor frame macroblocks.

7. The method as recited in claim 6, wherein independently encoding each of the anchor frame macroblocks further includes:
 subdividing each anchor frame macroblock into a plurality of subblocks;
 transforming each subblock by a discrete cosine transform (DCT); and
 entropy encoding each transformed subblock using a Huffman coder.

8. The method as recited in claim 7, wherein subdividing each anchor frame macroblock into the plurality of subblocks further includes subdividing each anchor frame macroblock into at least one chrominance subblock and at least one luminance subblock.

9. The method as recited in claim 7, wherein the discrete cosine transform (DCT) includes a basis-8 DCT that is quantized by a quantization scale associated with the plurality of anchor frames.

10. The method as recited in claim 1, wherein encoding the prediction residue for each of the predicted frames further includes:
 segmenting the at least one anchored frame into a plurality of anchor frame macroblocks;
 segmenting each of the predicted frames into a plurality of predicted frame macroblocks; and
 encoding each of the predicted frame macroblocks using motion compensation.

11. The method as recited in claim 10, wherein encoding each of the predicted frame macroblocks using motion compensation further includes:
 for each predicted frame macroblock, searching in at least an area within the image data array near the predicted frame macroblock for a significantly best matching anchor frame macroblock;
 determining a reference vector for each predicted frame macroblock within each predicted frame, the reference vector indicating a position of the significantly best matching anchor frame macroblock;
 for each predicted frame macroblock, determining a prediction residue for the predicted frame macroblock by the difference between a predicted frame macroblock value and an anchor frame macroblock value.

12. The method as recited in claim 11, wherein encoding each of the predicted frame macroblocks using motion compensation further includes decoding each of the encoded anchor frames.

13. The method as recited in claim 11, wherein determining the prediction residue for the predicted frame macroblock further includes:
 for each predicted frame macroblock, transforming residue by a discrete cosine transform (DCT); and
 entropy encoding each transformed residue using a Huffman coder.

14. The method as,recited in claim 13, wherein the discrete cosine transform (DCT) includes a basis-8 DCT that is quantized by a quantization scale associated with the plurality of predicted frames.

15. The method as recited in claim 13, wherein encoding each of the predicted frame macroblocks using motion compensation further includes using a translation-based motion model.

16. The method as recited in claim 13, wherein encoding each of the predicted frame macroblocks using motion compensation further includes using an affine motion model.

17. The method as recited in claim 13, wherein encoding each of the predicted frame macroblocks using motion compensation further includes using a perspective motion model.

18. The method as recited in claim 1, further comprising outputting a bitstream having the encoded anchor same data, the encoded predicted frame data, and the encoded index.

19. The method as recited in claim 18, wherein the bitstream further includes quantization scale information.

20. The method as recited in claim 18, wherein the encoded predicted frame data includes encoded prediction residue.

21. The method as recited in claim 18, wherein the encoded index is configured to identify each encoded anchor frame and each encoded predicted frame.

22. The method as recited in claim 21, wherein the encoded anchor frame data is further configured to identify encoded macroblocks within each encoded anchor frame.

23. The method as recited in claim 21, wherein the encoded predicted frame data is further configured to identify encoded predicted frame macroblocks within each encoded predicted frame.

24. The method as recited in claim 1, wherein the image data array is a Lumigraph.

25. The method as recited in claim 1, wherein the image data array is a Lightfield.

26. A computer-readable medium having computer-executable instructions for use in compressing an image data array having image data associated with a plurality of frames, the computer-executable instructions providing steps comprising:
 selectivity dividing the plurality of frames into a plurality of anchor frames and a plurality of predicted frames;
 independently encoding each of the anchor frames;
 encoding a prediction residue for each of the predicted frames, the prediction residue for each of the predicted frames being determined by referring each of the predicted frames to at least one of the anchor frames; and
 encoding an index of the anchor frames and the predicted frames, wherein the encoded index is configured to support random access to selected frames during a decoding process.

27. The computer-readable medium as recited in claim 26, wherein selectively dividing the plurality of frames further includes staggering the anchor frames in a pattern within the plurality of predicted frames.

28. The computer-readable medium as recited in claim 27, wherein the pattern is a grid pattern based on an equal distance between neighboring anchor frames.

29. The computer-readable medium as recited in claim 28, wherein the equal distance causes at least one predicted frame to be located between at least two neighboring anchor frames as situated with a two-dimensional image data array.

30. The computer-readable medium as recited in claim 28, wherein the equal distance causes three predicted frames to be located between at least two neighboring anchor frames as situated with a two-dimensional image data array.

31. The computer-readable medium as recited in claim 26, wherein independently encoding each of the anchor frames further includes:
   segmenting each of the anchor frames into a plurality of anchor frame macroblocks; and
   independently encoding each of the anchor frame macroblocks.

32. The computer-readable medium as recited in claim 31, wherein independently encoding each of the anchor frame macroblocks further includes:
   subdividing each anchor frame macroblock into a plurality of subblocks;
   transforming each subblock by a discrete cosine transform (DCT); and
   entropy encoding each transformed subblock using a Huffman coder.

33. The computer-readable medium as recited in claim 32, wherein subdividing each anchor frame macroblock into the plurality of subblocks further includes subdividing each anchor frame macroblock into at least one chrominance subblock and at least one luminance subblock.

34. The computer-readable medium as recited in claim 32, wherein the discrete cosine transform (DCT) includes a basis-8 DCT that is quantized by a quantization scale associated with the plurality of anchor frames.

35. The method as recited in claim 26, wherein encoding the prediction residue for each of the predicted frames further includes:
   segmenting the at least one anchored frame into a plurality of anchor frame macroblocks;
   segmenting each of the predicted frames into a plurality of predicted frame macroblocks; and
   encoding each of the predicted frame macroblocks using motion compensation.

36. The computer-readable medium as recited in claim 35, wherein encoding each of the predicted frame macroblocks using motion compensation further includes:
   for each predicted frame macroblock, searching in at least an area within the image data array near the predicted frame macroblock for a significantly best matching anchor frame macroblock;
   determining a reference vector for each predicted frame macroblock within each predicted frame, the reference vector indicating a position of the significantly best matching anchor frame macroblock;
   for each predicted frame macroblock, determining a prediction residue for the predicted frame macroblock by the difference between a predicted frame macroblock value and an anchor frame macroblock value.

37. The computer-readable medium as recited in claim 36, wherein encoding each of the predicted frame macroblocks using motion compensation further includes decoding each of the encoded anchor frames.

38. The computer-readable medium as recited in claim 36, wherein determining the prediction residue for the predicted frame macroblock further includes:
   for each predicted frame macroblock, transforming residue by a discrete cosine transform (DCT); and
   entropy encoding each transformed residue using a Huffman coder.

39. The computer-readable medium as recited in claim 38, wherein the discrete cosine transform (DCT) includes a basis-8 DCT that is quantized by a quantization scale associated with the plurality of predicted frames.

40. The computer-readable medium as recited in claim 38, wherein encoding each of the predicted frame macroblocks using motion compensation further includes using a translation-based motion model.

41. The computer-readable medium as recited in claim 38, wherein encoding each of the predicted frame macroblocks using motion compensation further includes using an affine motion model.

42. The computer-readable medium as recited in claim 38, wherein encoding each of the predicted frame macroblocks using motion compensation further includes using a perspective motion model.

43. The computer-readable medium as recited in claim 26, wherein the computer-executable instructions further include the step of outputting a bitstream comprising the encoded anchor frame data, the encoded predicted frame data, and the encoded index.

44. The computer-readable medium as recited in claim 43, wherein the bitstream further includes quantization scale information.

45. The computer-readable medium as recited in claim 43, wherein the encoded predicted frame data includes encoded prediction residue.

46. The computer-readable medium as recited in claim 44, wherein the encoded index is configured to identify each encoded anchor frame and each encoded predicted frame.

47. The computer-readable medium as recited in claim 46, wherein the encoded anchor frame data is further configured to identify encoded anchor frame macroblocks within each encoded anchor frame.

48. The computer-readable medium as recited in claim 46, wherein the encoded predicted frame data is further configured to identify encoded predicted frame macroblocks within each encoded predicted frame.

49. An arrangement comprising:
   memory suitable for storing an image data array having image data associated with a plurality of frames;
   a processor operatively coupled to the memory and configured to:
      selectively divide the plurality of frames into a plurality of anchor frames and a plurality of predicted frames,
      independently encode each of the anchor frames,
      encode a prediction residue for each of the predicted frames, the prediction residue for each of the predicted frames being determined by referring each of the predicted frames to at least one of the anchor frames, and
      encode an index of the anchor frames and the predicted frames, wherein the encoded index is configured to support random access to selected frames during a decoding process.

50. The arrangement as recited in claim 49, wherein the processor is further configured to stagger the anchor frames in a pattern within the plurality of predicted frames.

51. The arrangement as recited in claim 50, wherein the pattern is a grid pattern based on an equal distance between neighboring anchor frames.

52. The arrangement as recited in claim 51, wherein the equal distance causes at least one predicted frame to be located between at least two neighboring anchor frames as situated with a virtual two-dimensional image data array.

53. The arrangement as recited in claim 51, wherein the equal distance causes three predicted frames to be located between at least two neighboring anchor frames as situated with a virtual two-dimensional image data array.

54. The arrangement as recited in claim 49, wherein the processor is further configured to:
  segment each of the anchor frames into a plurality of anchor frame macroblocks; and
  independently encode each of the anchor frame macroblocks.

55. The arrangement as recited in claim 54, wherein the processor is further configured to:
  subdivide each anchor frame macroblock into a plurality of subblocks;
  transform each subblock by a discrete cosine transform (DCT); and
  entropy encode each of transformed subblock using a Huffman coder.

56. The arrangement as recited in claim 55, wherein the processor is further configured to subdivide each anchor frame macroblock into at least one chrominance subblock and at least one luminance subblock.

57. The arrangement as recited in claim 55, wherein the discrete cosine transform (DCT) includes a basis-8 DCT that is quantized by a quantization scale associated with the plurality of anchor frames.

58. The arrangement as recited in claim 49, wherein the processor is further configured to:
  segment the at least one anchored frame into a plurality of anchor frame macroblocks;
  segment each of the predicted frames into a plurality of predicted frame macroblocks; and
  encode each of the predicted frame macroblocks using motion compensation.

59. The arrangement as recited in claim 58, wherein the processor is further configured to encode each of the predicted frame macroblocks using motion compensation by:
  for each predicted frame macroblock, searching in at least an area within the image data array near the predicted frame macroblock for a significantly best matching anchor frame macroblock;
  determining a reference vector for each predicted frame macroblock within each predicted frame, the reference vector indicating a position of the significantly best matching anchor frame macroblock;
  for each predicted frame macroblock, determining a prediction residue for the predicted frame macroblock by the difference between a predicted frame macroblock value and an anchor frame macroblock value.

60. The arrangement as recited in claim 59, wherein the processor is further configured to encode each of the predicted frame macroblocks using motion compensation by first decoding each of the encoded anchor frames.

61. The arrangement as recited in claim 60, wherein the processor is further configured to:
  for each predicted frame macroblock, transform residue by a discrete cosine transform (DCT); and
  entropy encode each transformed residue using a Huffman coder.

62. The arrangement as recited in claim 61, wherein the discrete cosine transform (DCT) includes a basis-8 DCT that is quantized by a quantization scale associated with the plurality of predicted frames.

63. The arrangement as recited in claim 61, wherein the processor is further configured to use a translation-based motion model to encode each of the predicted frame macroblocks using motion compensation.

64. The arrangement as recited in claim 61, wherein the processor is further configured to use an affine motion model to encode each of the predicted frame macroblocks using motion compensation.

65. The arrangement as recited in claim 61, wherein the processor is further configured to use a perspective motion model to encode each of the predicted frame macroblocks using motion compensation.

66. The arrangement as recited in claim 49, wherein the processor is further configured to output a bitstream comprising encoded anchor frame data, encoded predicted frame data, and indexing data.

67. The arrangement as recited in claim 66, wherein the bitstream further includes quantization scale information.

68. The arrangement as recited in claim 66, wherein the encoded predicted frame data includes encoded prediction residue.

69. The arrangement as recited in claim 66, wherein the indexing data is configured to identify each encoded anchor frame and each encoded predicted frame.

70. The arrangement as recited in claim 69, wherein the encoded anchor frame data is further configured to identify encoded anchor frame macroblocks within each encoded anchor frame.

71. The arrangement as recited in claim 69, wherein the encoded predicted frame data is further configured to identify encoded predicted frame macroblocks within each encoded predicted frame.

72. A method for decompressing a bitstream having encoded anchor frame data, encoded predicted frame data, and an encoded index associated with a compressed image data array having image data associated with a plurality of frames, the method comprising:
  wherein an encoded index is configured to support random access to selected frames, accessing the encoded index to identify:
    a unique location for each encoded anchor frame within the encoded anchor frame data and from each encoded anchor frame each encoded anchor frame macroblock therein, and
    a unique location for each encoded predicted frame within the encoded predicted frame data and from each encoded predicted frame each encoded predicted frame macroblock therein;
  for each new view to be rendered, determining which encoded anchor frame macroblocks and encoded predicted frame macroblocks are to be used in rendering the new view;
  selectively decoding the encoded anchor frame macroblock to be used in rendering the new view; and
  selectively decoding the predicted frame macroblock using all referenced decoded anchor frame macroblocks for the predicted frame macroblock.

73. The method as recited in claim 72, wherein selectively decoding the encoded anchor frame macroblock to be used in rendering the new view further includes:
  for each encoded anchor frame macroblock to be used in rendering the new view, determining:
    if the encoded anchor frame macroblock has an existing corresponding decoded anchor frame macroblock, and if so, using the existing corresponding decoded anchor frame macroblock in rendering the new view, otherwise, decoding the encoded anchor frame macroblock to be used in rendering the new view.

74. The method as recited in claim 72, wherein selectively decoding the predicted frame macroblock using all referenced decoded anchor frame macroblocks for the predicted frame macroblock further includes:

for each encoded predicted frame macroblock to be used in rendering the new view, determining if:

the encoded predicted frame macroblock has an existing corresponding decoded predicted frame macroblock, and if so, using the existing corresponding decoded predicted frame macroblock in rendering the new view, otherwise decoding the predicted frame macroblock using all referenced decoded anchor frame macroblocks for the predicted frame macroblock.

75. The method as recited in claim 72, wherein each encoded predicted frame includes a prediction residue associated with at least one referenced anchor frame.

76. The method as recited in claim 72, wherein decoding the encoded anchor frame macroblock to be used in rendering the new view further includes using an inverse discrete cosine transform (DCT).

77. The method as recited in claim 76, wherein the inverse discrete cosine transform (DCT) includes a basis-8 inverse DCT that is quantized by a quantization scale associated with the plurality of predicted frames.

78. The method as recited in claim 72, wherein the bitstream further includes quantization scale information.

79. The method as recited in claim 72, wherein decoding the predicted frame macroblock using all referenced decoded anchor frame macroblocks for the predicted frame macroblock further includes:

decoding each referenced encoded anchor frame macroblock for which there is no existing corresponding decoded anchor frame macroblock; and decoding the predicted frame macroblock using motion compensation using a prediction residue.

80. The method as recited in claim 72, wherein determining which encoded anchor frame macroblocks and encoded predicted frame macroblocks are to be used in rendering the new view further includes:

responding to inputs requesting the new view;

splitting the new view into a plurality of rays, wherein each ray passes through two parallel planes; and identifying an intersecting coordinate for each ray that locates which encoded anchor frame macroblocks and encoded predicted frame macroblocks are to be used in rendering the new view with respect to the compressed image data array.

81. The method as recited in claim 80, wherein identifying an intersecting coordinate for each ray further includes:

bilinearly interpolating with a portion of the plurality of rays to calculate at least one intersecting coordinate.

82. The method as recited in claim 72, wherein selectively decoding the encoded anchor frame macroblock to be used in rendering the new view further includes storing the decoded anchor frame macroblock in a first memory cache.

83. The method as recited in claim 82, wherein selectively decoding the predicted frame macroblock using all referenced decoded anchor frame macroblocks for the predicted frame macroblock further includes storing the decoded predicted frame macroblock in a second memory cache.

84. The method as recited in claim 72, further comprising rendering the new view on at least one output device.

85. The method as recited in claim 72, wherein the new view to be rendered is based on at least a portion of a Lumigraph image data array.

86. The method as recited in claim 72, wherein the new view to be rendered is based on at least a portion of a Lightfield image data array.

87. A computer-readable medium having computer-executable instructions for decompressing a bitstream having encoded anchor frame data, encoded predicted frame data, and an encoded index associated with a compressed image data array having image data associated with a plurality of frames, the computer-executable instructions providing steps comprising:

wherein an encoded index is configured to support random access to selected frames, accessing the encoded index to identify:

a unique location for each encoded anchor frame within the encoded anchor frame data and from each encoded anchor frame each encoded anchor frame macroblock therein, and a unique location for each encoded predicted frame within the encoded predicted frame data and from each encoded predicted frame each encoded predicted frame macroblock therein;

for each new view to be rendered, determining which encoded anchor frame macroblocks and encoded predicted frame macroblocks are to be used in rendering the new view;

selectively decoding the encoded anchor frame macroblock to be used in rendering the new view; and selectively decoding the predicted frame macroblock using all referenced decoded anchor frame macroblocks for the predicted frame macroblock.

88. The computer-readable medium as recited in claim 87, wherein selectively decoding the encoded anchor frame macroblock to be used in rendering the new view further includes:

for each encoded anchor frame macroblock to be used in rendering the new view, determining:

if the encoded anchor frame macroblock has an existing corresponding decoded anchor frame macroblock, and if so, using the existing corresponding decoded anchor frame macroblock in rendering the new view, otherwise, decoding the encoded anchor frame macroblock to be used in rendering the new view.

89. The computer-readable medium as recited in claim 87, wherein selectively decoding the predicted frame macroblock using all referenced decoded anchor frame macroblocks for the predicted frame macroblock further includes:

for each encoded predicted frame macroblock to be used in rendering the new view, determining if:

the encoded predicted frame macroblock has an existing corresponding decoded predicted frame macroblock, and if so, using the existing corresponding decoded predicted frame macroblock in rendering the new view, otherwise decoding the predicted frame macroblock using all referenced decoded anchor frame macroblocks for the predicted frame macroblock.

90. The computer readable medium as recited in claim 87, wherein each encoded predicted frame includes a prediction residue associated with at least one referenced anchor frame.

91. The computer-readable medium as recited in claim 87, wherein decoding the encoded anchor frame macroblock to be used in rendering the new view further includes using an inverse discrete cosine transform (DCT).

92. The computer-readable medium as recited in claim 91, wherein the inverse discrete cosine transform (DCT) includes a basis-8 inverse DCT that is quantized by a quantization scale associated with the plurality of predicted frames.

93. The computer-readable medium as recited in claim 87, wherein the bitstream further includes quantization scale information.

94. The computer-readable medium as recited in claim 87, wherein decoding the predicted frame macroblock using all referenced decoded anchor frame macroblocks for the predicted frame macroblock further includes:
   decoding each referenced encoded anchor frame macroblock for which there is no existing corresponding decoded anchor frame macroblock; and
   decoding the predicted frame macroblock using motion compensation using a prediction residue.

95. The computer-readable medium as recited in claim 87, wherein determining which encoded anchor frame macroblocks and encoded predicted frame macroblocks are to be used in rendering the new view further includes:
   responding to inputs requesting the new view;
   splitting the new view into a plurality of rays, wherein each ray passes through two parallel planes; and
   identifying an intersecting coordinate for each ray that locates which encoded anchor frame macroblocks and encoded predicted frame macroblocks are to be used in rendering the new view with respect to the compressed image data array.

96. The computer-readable medium as recited in claim 95, wherein identifying an intersecting coordinate for each ray further includes:
   bilinearly interpolating with a portion of the plurality of rays to calculate at least one intersecting coordinate.

97. The computer-readable medium as recited in claim 87, wherein selectively decoding the encoded anchor frame macroblock to be used in rendering the new view further includes storing the decoded anchor frame macroblock in a first memory cache.

98. The computer-readable medium as recited in claim 97, wherein selectively decoding the predicted frame macroblock using all referenced decoded anchor frame macroblocks for the predicted frame macroblock further includes storing the decoded predicted frame macroblock in a second memory cache.

99. The computer-readable medium as recited in claim 87, the computer-executable instructions further provide the step of rendering the new view on at least one output device.

100. An arrangement comprising:
   memory suitable for storing a bitstream having encoded anchor frame data, encoded predicted frame data, and an encoded index associated with a compressed image data array having image data associated with a plurality of frames, wherein the encoded index is configured to support random access to selected frames; and
   a processor operatively coupled to the memory and configured to:
      access the encoded index to identify a unique location for each encoded anchor frame within the encoded anchor frame data and from each encoded anchor frame each encoded anchor frame macroblock therein,
      access the index data to identify a unique location for each encoded predicted frame within the encoded predicted frame data and from each encoded predicted frame each encoded predicted frame macroblock therein,
      for each new view to be rendered, determine which encoded anchor frame macroblocks and encoded predicted frame macroblocks are to be used in rendering the new view,
      selectively decode the encoded anchor frame macroblock to be used in rendering the new view, and
      selectively decode the predicted frame macroblock using all referenced decoded anchor frame macroblocks for the predicted frame macroblock.

101. The arrangement as recited in claim 100, wherein the processor is further configured to selectively decode the encoded anchor frame macroblock to be used in rendering the new view by:
   for each encoded anchor frame macroblock to be used in rendering the new view, determining:
      if the encoded anchor frame macroblock has an existing corresponding decoded anchor frame macroblock in the memory, and if so, using the existing corresponding decoded anchor frame macroblock in rendering the new view,
      otherwise, decoding the encoded anchor frame macroblock to be used in rendering the new view and storing the resulting decoded anchor frame macroblock to the memory.

102. The arrangement as recited in claim 100, wherein the processor is further configured to selectively decode the predicted frame macroblock using all referenced decoded anchor frame macroblocks for the predicted frame macroblock by:
   for each encoded predicted frame macroblock to be used in rendering the new view, determining if:
      the encoded predicted frame macroblock has an existing corresponding decoded predicted frame macroblock in the memory, and if so, using the existing corresponding decoded predicted frame macroblock in rendering the new view,
      otherwise decoding the predicted frame macroblock using all referenced decoded anchor frame macroblocks for the predicted frame macroblock and storing the resulting decoded predicted frame macroblock to the memory.

103. The arrangement as recited in claim 100, wherein each encoded predicted frame includes a prediction residue associated with at least one referenced anchor frame.

104. The arrangement as recited in claim 100, wherein the processor is further configured to decode the encoded anchor frame macroblock to be used in rendering the new view using an inverse discrete cosine transform (DCT).

105. The arrangement as recited in claim 104, wherein the inverse discrete cosine transform (DCT) includes a basis-8 inverse DCT that is quantized by a quantization scale associated with the plurality of predicted frames.

106. The arrangement as recited in claim 100, wherein the bitstream further includes quantization scale information.

107. The arrangement as recited in claim 100, wherein the processor is further configured to decode the predicted frame macroblock using all referenced decoded anchor frame macroblocks for the predicted frame macroblock by:
   decoding each referenced encoded anchor frame macroblock for which there is no existing corresponding decoded anchor frame macroblock and storing the resulting decoded anchor frame macroblock to the memory; and
   decoding the predicted frame macroblock using motion compensation using a prediction residue.

108. The arrangement as recited in claim 100, wherein the processor is further configured to determine which encoded anchor frame macroblocks and encoded predicted frame macroblocks are to be used in rendering the new view by:

receiving to inputs defining the new view;

splitting the new view into a plurality of rays, wherein each ray passes through two parallel planes; and identifying an intersecting coordinate for each ray that locates which encoded anchor frame macroblocks and encoded predicted frame macroblocks are to be used in rendering the new view with respect to the compressed image data array.

109. The arrangement as recited in claim 108, wherein the processor is further configured to identify an intersecting coordinate for each ray by bilinearly interpolating with a portion of the plurality of rays to calculate at least one intersecting coordinate.

110. The arrangement as recited in claim 100, further comprising at least one output device operatively coupled to the processor, and wherein the processor is further configured to cause the new view to be provided to the output device.

111. A computer-readable medium having stored thereon a data structure, comprising:

an encoded frame index table;

a plurality of encoded anchor frames as indexed by the encoded frame index table; and a plurality of encoded predicted frames as indexed by the encoded frame index table, and wherein the encoded frame index is configured to support random access to selected frames.

112. The computer-readable medium as recited in claim 111, wherein:

each of the plurality of encoded anchor frames further includes anchor frame macroblock indexing information; and each of the plurality of encoded predicted frames further includes predicted frame macroblock indexing information.

113. The computer-readable medium as recited in claim 111, wherein the data structure further includes quantization scale information associated with the encoded anchor frames and the encoded predicted frames.

* * * * *

UNITED STATES PATENT AND TRADEMARK OFFICE
CERTIFICATE OF CORRECTION

PATENT NO. : 6,693,964 B1
DATED : February 17, 2004
INVENTOR(S) : Zhang et al.

It is certified that error appears in the above-identified patent and that said Letters Patent is hereby corrected as shown below:

<u>Column 18,</u>
Line 28, replace "same" with -- frame -- between "anchor" and "data".

Signed and Sealed this

Sixth Day of July, 2004

JON W. DUDAS
*Acting Director of the United States Patent and Trademark Office*